Feb. 20, 1968  G. L. WITT  3,369,499

CABLE ELEMENT FOR CONVEYORS

Filed May 23, 1966

INVENTOR
GEORGE L. WITT

BY Cullen, Sloman, & Cantor

ATTORNEYS

United States Patent Office 3,369,499
Patented Feb. 20, 1968

3,369,499
CABLE ELEMENT FOR CONVEYORS
George L. Witt, Pontiac, Mich., assignor to My-T-Veyor Corporation, Oxford, Mich., a corporation of Michigan
Filed May 23, 1966, Ser. No. 552,149
2 Claims. (Cl. 104—200)

This invention relates to a trolley conveyor cable link and more particularly a cable link having heads at its opposite ends which are accurately spaced apart and positively interlocked with the cable.

Trolley conveyors, as illustrated for example in Patent No. 3,179,452, dated Apr. 20, 1965, generally comprise a number of trolley elements supported upon a conveyor rail, with the trolley elements interconnected and pulled by means of cable links. In such conveyors, the individual trolley elements must be accurately spaced apart in order to properly interlock with various drive mechanisms used in connection therewith. In addition, since considerable force is exerted through the cables in moving the trolleys, the heads of the cables, which are loosely connected to the trolley elements, must be capable of sustaining large forces without loosening or shifting or changing spacing or dimensional accuracy.

Hence, it is an object of this invention to provide trolley conveyor cable links with end heads which are positively locked to the ends of the wire cable and accurately spaced thereon, yet are assembled thereto by simple mechanical fixtures or dies without the need for welding or other heat type fastening means.

Another object of this invention is to provide a method of forming heads upon trolley cable links, comprising providing cup-shaped sleeves upon the ends of the wire cable and then upsetting or compacting the ends of the cable tightly into said sleeves and thereafter bending the ends of the sleeves to grip and clamp the compacted ends of the cable within the sleeves to thereby mechanically interlock the sleeves to the ends of the cables.

These and other objects and advantages of this invention will become apparent upon reading the following descriptions, of which the attached drawings form a part.

Figure 1:
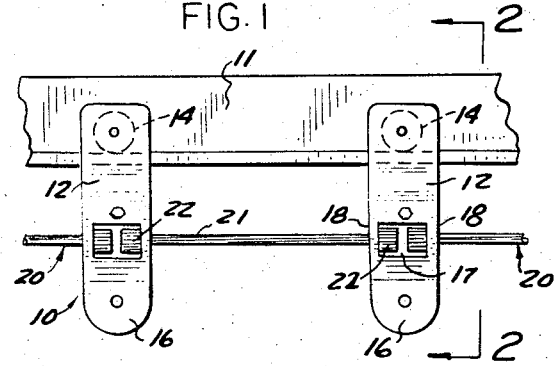
FIG. 1 is a side view of a portion of a trolley conveyor, showing two trolley elements interconnected by a trolley conveyor cable link.
Figure 2:
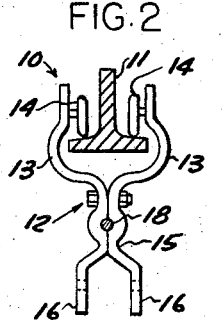
FIG. 2 is an end view taken in the direction of arrows 2—2 of FIG. 1.

Referring to FIGS. 1 and 2, the conventional trolley conveyor 10 is formed of an inverted T-shaped rail 11 for illustration, upon which are suspended trolley elements 12 each formed of identical, but reversed, half sections 13, connected together. Rollers 14, mounted upon the sections ride upon the base of the rail 11 for supporting the trolley elements.

The half sections 13 are secured together at their middles 15, and their lower ends 16 are formed to support various items to be conveyed.

Aligned slots 17, formed in the sections 13 open into edge tunnels 18, formed by suitably bending apart the adjacent edges of the two sections 13. Through such tunnels, the cable links 20 are inserted.

The cable links 20 are formed of wire cable 21, which is a relatively stiff wire rope formed of many strands of metal, but which can be bent to some extent as the trolleys go around corners, and which is of sufficient strength and diameter to pull the trolleys. Heads 22, formed on the opposite ends of each cable link serve to transmit the pull of the cables to the trolley elements and at the same time to space the elements apart the predetermined proper distance.

All of the above construction forms no part of the invention herein. The invention herein relates to the improved cable link and method of making such cable link.

The heads 22 are formed of cup-shaped sleeves or cylinders 23 each having one closed flat end 24 with a central opening 25 of a size to receive the wire cable 21. The cup-shaped sleeves are formed of thin wall, sheet metal with an internal diameter which is considerably greater than the diameter of the cable.

Figure 3:
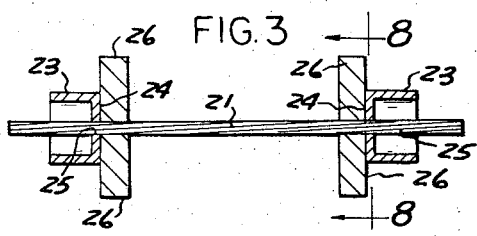
FIGS. 3, 4, 5 and 6 show successive steps in the formation of the trolley cable link herein.
Figure 8:
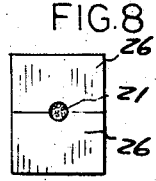
FIG. 8 is a view taken in the direction of arrows 8—8 of FIG. 3.

Referring first to FIG. 3, the steps in forming the novel cable link comprises: gripping the wire cable 21 by two sets of gripping dies 26 (also see FIG. 8) at a predetermined distance from each end of the cable, which has previously been cut into a predetermined accurate length. Thereafter, the cup-shaped sleeves or members 23 are slipped over the ends of the cable to abut the gripping dies 26. The flat ends 24 face towards each other so that they are accurately located apart a predetermined distance.

Figure 4:
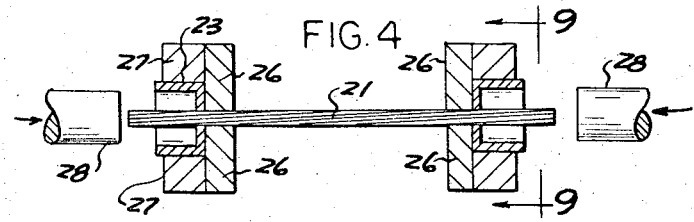
Figure 9:
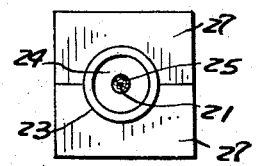
FIG. 9 is a view taken in the direction of arrows 9—9 of FIG. 4.

Next, as shown in FIG. 4, the sleeves are held by the sleeve grip dies 27 while rams 28 arranged at the opposite ends of the cable move inwardly toward each other to compact the cable ends.

Figure 5:
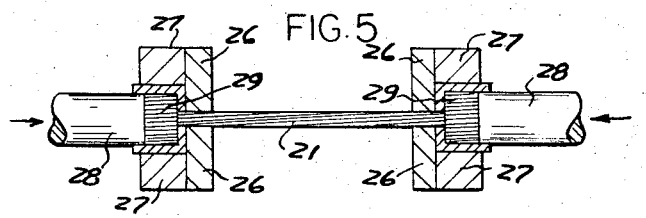

Referring next to FIG. 5, the rams 28 move inwardly a sufficient distance to tightly compact or upset the ends of the cable whereby the ends are enlarged so as to substantially completely fill the interior of the sleeves from their closed ends to points near their open ends.

Figure 6:
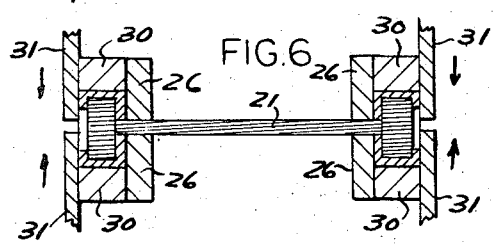

Thereafter the rams 28 are withdrawn and the dies 27 are replaced by a narrower set of dies 30 so that the free ends of the sleeves or cylinders are exposed, at which point, closing or shear dies 31 moving inwardly toward each other as indicated by the arrows in FIG. 6, bend the free ends of the sleeves towards each other to thereby close the sleeves and clamp and hold the compacted mass of wire within the sleeves.

Figure 7:
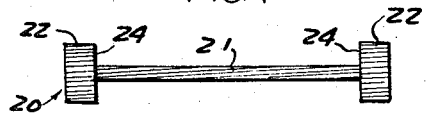
FIG. 7 illustrates a completed cable link.

Following these steps, the cable link is removed from the dies and, as shown in FIG. 7, now comprises a length of wire cable 21 with the heads 22 formed thereon and with the flat ends 24 now forming accurately spaced-apart shoulders.

With this construction, the heads 22 are mechanically locked to the cable in such a manner as to prevent removal except by complete destruction of the heads. This locking is accomplished without resort to welding or soldering or other heat fastening methods.

This invention may be further developed within the scope of the following claims. Accordingly, it is desired that the foregoing description be read as being merely illustrative of an operative embodiment of this invention and not in a strictly limited sense.

I now claim:

1. A trolley conveyor cable link for interconnecting a pair of spaced-apart conveyor trolleys, comprising:

a short length of relatively stiff, wire cable;

a pair of thin-walled, hollow sleeves, each having an internal diameter which is considerably greater then the diameter of such cable, and each having a closed end formed with a central opening of a size to coaxially receive such cable;

with one end of the cable being inserted within one of said sleeves and the other end of the cable inserted within the other sleeve, and with said closed ends facing towards each other;

the cable end portions within each sleeve being enlarged to substantially fill the sleeves from their closed ends to a point near their free ends and the free end portions of the sleeve walls being bent inwardly to form covers to tightly clamp and hold the compacted ends within said sleeves.

2. A construction as defined in claim 1, and said closed ends being flat on their exterior walls and being spaced apart a predetermined distance for forming stop shoulders for accurately spacing apart a pair of trolley conveyors.

References Cited

UNITED STATES PATENTS 3,179,452  4/1965  Daigle _____ 287—103

ARTHUR L. LA POINT, *Primary Examiner.*

D. F. WORTH, *Assistant Examiner.*